(12) United States Patent
Shihab et al.

(10) Patent No.: US 9,985,909 B2
(45) Date of Patent: May 29, 2018

(54) METHOD AND APPARATUS FOR IMPLEMENTING AN ADAPTIVE COEXISTENCE SCHEME

(71) Applicant: Provenance Asset Group LLC, Essex, CT (US)

(72) Inventors: Jamil Shihab, Algonquin, IL (US); Jiang Chang, Arlington Heights, IL (US); Hua Xu, Hawthorn Woods, IL (US)

(73) Assignee: Provenance Asset Group LLC, Essex, CT (US)

( * ) Notice: Subject to any disclaimer, the term of this patent is extended or adjusted under 35 U.S.C. 154(b) by 22 days.

(21) Appl. No.: 15/010,616

(22) Filed: Jan. 29, 2016

(65) Prior Publication Data

US 2017/0222951 A1   Aug. 3, 2017

(51) Int. Cl.
*H04W 4/00* (2018.01)
*H04L 12/911* (2013.01)
*H04W 24/08* (2009.01)
*H04L 12/835* (2013.01)
*H04W 28/02* (2009.01)

(52) U.S. Cl.
CPC ............ *H04L 47/826* (2013.01); *H04L 47/30* (2013.01); *H04W 24/08* (2013.01); *H04W 28/0268* (2013.01)

(58) Field of Classification Search
CPC combination set(s) only.
See application file for complete search history.

(56) References Cited

U.S. PATENT DOCUMENTS

| | | | |
|---|---|---|---|
| 9,414,386 B2 * | 8/2016 | Khawer | H04W 16/14 |
| 2015/0085683 A1 * | 3/2015 | Sadek | H04L 43/0894 370/252 |
| 2015/0085684 A1 | 3/2015 | Sadek | |
| 2015/0163823 A1 * | 6/2015 | Sadek | H04W 72/1215 370/336 |

OTHER PUBLICATIONS

Jian, Coexistence of Wi-Fi and LAA-Lte in Unlicensed Spectrum, Thesis, Georgia Institute of Technology, 63 pages, Dec. 2015.*

* cited by examiner

*Primary Examiner* — Frank Duong
(74) *Attorney, Agent, or Firm* — Dinsmore & Shohl LLP

(57) ABSTRACT

A method and apparatus may include adapting transmission opportunities of the first network node. A radio-technology of the apparatus coexists with at least one other radio-access technology of a network node. The adapting may include adapting when the apparatus is able to perform transmissions. The method may also include transmitting in accordance with a transmitting period. The transmitting period corresponds to a time over which the apparatus is configured to perform transmitting and to be muted. The transmitting may include transmitting on an unlicensed carrier.

12 Claims, 10 Drawing Sheets

| Algorithm | Scheduling opportunities, Ton | Adaptation factors | Dynamic parameters | Additional factors |
|---|---|---|---|---|
| ULACS | Segmented | System A and B channel utilization | Period, duty cycle | QoS requirements |
| TD-ULACS | Segmented | System A and B channel utilization | Period, duty cycle | QoS requirement and queued traffic |
| CSAT | Unsegmented | System A channel utilization | Duty cycle | None |
| Hybrid-ULACS | Unsegmented | System A channel utilization | Duty cycle | Queued traffic |

Fig. 7

METHOD AND APPARATUS FOR IMPLEMENTING AN ADAPTIVE COEXISTENCE SCHEME

BACKGROUND

Field

Certain embodiments of the present invention relate to implementing an adaptive coexistence scheme.

Description of the Related Art

Long-term Evolution (LTE) is a standard for wireless communication that seeks to provide improved speed and capacity for wireless communications by using new modulation/signal processing techniques. The standard was proposed by the 3rd Generation Partnership Project (3GPP), and is based upon previous network technologies. Since its inception, LTE has seen extensive deployment in a wide variety of contexts involving the communication of data.

SUMMARY

According to a first embodiment, a method may include adapting, by a first network node, transmission opportunities of the first network node. A radio-technology of the first network node coexists with at least one other radio-access technology of a second network node. The adapting may include adapting when the first network node is able to perform transmissions. The method may also include transmitting in accordance with a transmitting period. The transmitting period corresponds to a time over which the first network node is configured to perform transmitting and to be muted, and the transmitting may include transmitting on an unlicensed carrier.

In the method of the first embodiment, the adapting may include changing the transmitting period based on a measured load of the second network node and a quality-of-service parameter.

In the method of the first embodiment, the adapting may include triggering the transmitting based on traffic arrival. The traffic arrival corresponds to when packets for transmission by the first network node become available.

In the method of the first embodiment, the transmitting may include transmitting until a transmission is complete, as long as the transmitting does not exceed an estimated transmission rate.

In the method of the first embodiment, the method may also include determining whether the first network node is currently performing transmissions. If the first network node is currently performing transmissions, the first network node continues transmitting until a buffer of the first network node is empty. The transmitting period may include a pre-configured, fixed period.

In the method of the first embodiment, the transmitting period corresponds to a length of time between 200 ms and 500 ms.

According to a second embodiment, an apparatus may include at least one processor. The apparatus may also include at least one memory including computer program code. The at least one memory and the computer program code may be configured, with the at least one processor, to cause the apparatus at least to adapt transmission opportunities of the apparatus. A radio-technology of the apparatus coexists with at least one other radio-access technology of a network node. The adapting may include adapting when the apparatus is able to perform transmissions. The apparatus may also be caused to transmit in accordance with a transmitting period. The transmitting period corresponds to a time over which the apparatus is configured to perform transmitting and to be muted. The transmitting may include transmitting on an unlicensed carrier.

In the apparatus of the second embodiment, the adapting may include changing the transmitting period based on a measured load of the network node and a quality-of-service parameter.

In the apparatus of the second embodiment, the adapting may include triggering the transmitting based on traffic arrival, and the traffic arrival corresponds to when packets for transmission by the apparatus become available.

In the apparatus of the second embodiment, the transmitting may include transmitting until a transmission is complete, as long as the transmitting does not exceed an estimated transmission rate.

In the apparatus of the second embodiment, the apparatus may also be caused to determine whether the apparatus is currently performing transmissions. If the apparatus is currently performing transmissions, the apparatus continues transmitting until a buffer of the apparatus is empty. The transmitting period may include a pre-configured, fixed period.

In the apparatus of the second embodiment, the transmitting period corresponds to a length of time between 200 ms and 500 ms.

According to a third embodiment, a computer program product may be embodied on a non-transitory computer readable medium. The computer program product may be configured to control a processor to perform a method. The method may include adapting, by a first network node, transmission opportunities of the first network node. A radio-technology of the first network node coexists with at least one other radio-access technology of a second network node. The adapting may include adapting when the first network node is able to perform transmissions. The method may also include transmitting in accordance with a transmitting period. The transmitting period corresponds to a time over which the first network node is configured to perform transmitting and to be muted. The transmitting may include transmitting on an unlicensed carrier.

In the computer program product of the third embodiment, the adapting may include changing the transmitting period based on a measured load of the second network node and a quality-of-service parameter.

In the computer program product of the third embodiment, the adapting may include triggering the transmitting based on traffic arrival. The traffic arrival corresponds to when packets for transmission by the first network node become available.

In the computer program product of the third embodiment, the transmitting may include transmitting until a transmission is complete, as long as the transmitting does not exceed an estimated transmission rate.

In the computer program product of the third embodiment, the method may also include determining whether the first network node is currently performing transmissions. If the first network node is currently performing transmissions, the first network node continues transmitting until a buffer of the first network node is empty. The transmitting period may include a pre-configured, fixed period.

In the computer program of the third embodiment, the transmitting period corresponds to a length of time between 200 ms and 500 ms.

BRIEF DESCRIPTION OF THE DRAWINGS

For proper understanding of the invention, reference should be made to the accompanying drawings, wherein:

FIG. 7 compares segmented/unsegmented scheduling opportunities, adaptation factors, and dynamic parameters, among different methods, in accordance with certain embodiments of the invention.

DETAILED DESCRIPTION

Certain embodiments of the present invention relate to implementing an adaptive coexistence scheme. The scheme of certain embodiments may be used in conjunction with LTE Unlicensed (LTE-U) technologies. LTE-U is directed to a downlink or uplink supplemental carrier in a 5 GHz unlicensed band that is using LTE. Operation in this unlicensed band may require coexistence with different Radio Access Technologies (RATs). Currently, IEEE 802.11n/ac (Wi-Fi) is one of the most prevalent RATs in the 5 GHz unlicensed band.

3GPP Release 13 study items are presently considering a number of options for downlink (DL) and/or uplink (UL) operation in the unlicensed band. The considered options for operation in the unlicensed band include License Assisted Access (LAA) and LTE Wi-Fi Aggregation (LWA).

In general, there is a need to meet the design targets of LTE-U. These design targets may include: (1) implementing an effective and fair coexistence of a RAT with a same RAT (where different operators use a same RAT, for example), and/or (2) implementing an effective and fair coexistence of a RAT with a different RAT (where the other RAT is Wi-Fi, for example).

Figure 1:
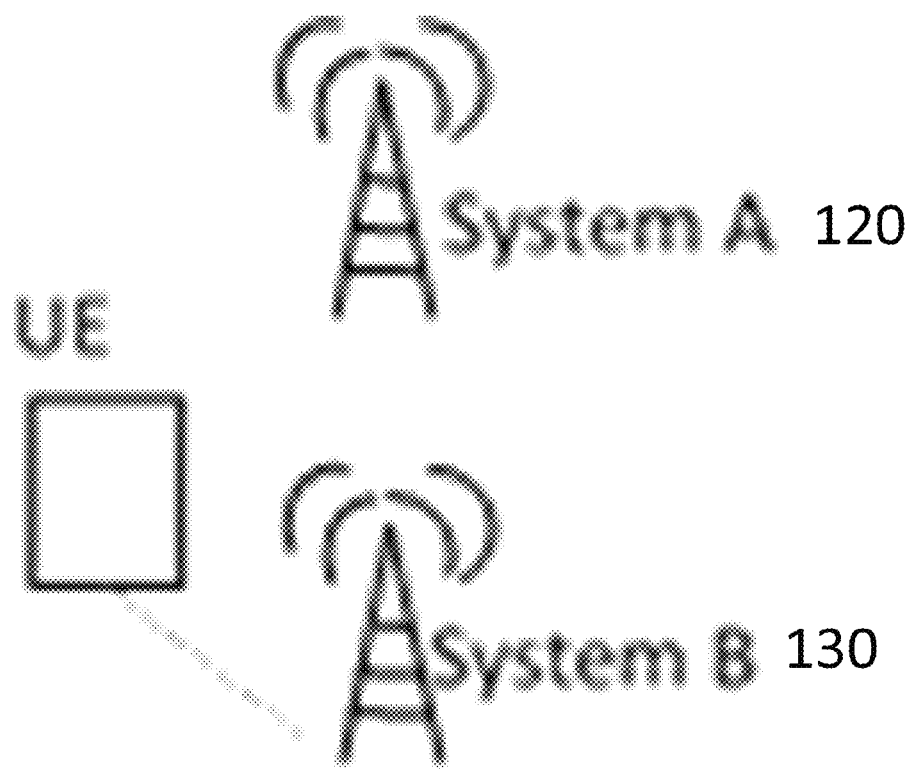
FIG. 1 illustrates a network in an unlicensed band, in accordance with certain embodiments of the present invention.

FIG. 1 illustrates a network in an unlicensed band, in accordance with certain embodiments of the present invention. Referring to FIG. 1, system B 130 may represent a network node that uses LTE-U. System A 120 may represent a network node that uses a same or a different RAT (such as IEEE 802.11 Wi-Fi, for example.) compared to LTE-U. System B 130 may represent a network node that also uses LTE-U. As described above, the user of LTE-U by system B 130 may need to coexist with a number of current and future RATs in a same channel. For example, the use of LTE-U of system B 130 may need to coexist with Wi-Fi and/or LTE-U of different operators. The coexistence of different RATs can cause significant Radio Frequency (RF) interference, which may negatively impact a performance of the wireless systems.

As described above, LTE-U may need to coexist with IEEE 802.11-related technologies. A scheduling mechanism for system B 130 may be needed to mitigate RF interference, while still providing sufficient performance to meet the quality-of-service (QoS) requirements for each of system B 130 and/or system A 120. Further, the QoS requirements for each of the applications (i.e., voice, web-surfing, etc.) that are provided on the systems may also need to be satisfied.

Certain embodiments of the present invention may utilize a traffic-driven approach for mitigating the interference which results from coexisting RATs. The traffic-driven approach of certain embodiments may depend upon several factors such as a data queue depth, a QoS requirement (for example, a requirement relating to packet delay), and a utilization of the corresponding network channel, as described in more detail below.

Certain embodiments provide a mechanism/approach for scheduling transmissions of a RAT to coexist with the services of a Carrier-Sense-Multiple-Access/Collision-Avoidance (CSMA/CA) based system. The mechanism/approach of certain embodiments may be implemented by system B 130, for example.

Certain embodiments of the present invention may be directed to an Unbiased-Load-Adaptive-Coexistence-Scheme (ULACS). ULACS may adapt the transmission opportunities of system B 130 based on a long term load of system A 120, on the unlicensed carrier. ULACS may adapt the transmission opportunities of system B 130 by adapting the transmission period and/or the duty cycle of system B 130. The transmission period and duty cycle may be changed after a certain time, which may be referred to as an adaptation period. The load of system A 120 may be determined by performing channel sensing by system B 130. The load of system A 120 may also be measured by system A 120 directly, or the load of system A 120 may be determined by user-equipment assisted measurements from system A or system B.

Another embodiment may be directed to a Traffic Driven ULACS (TD-ULACS) mechanism. TD-ULACS may perform in a similar manner as compared to standard ULACS, however, TD-ULACS may give priority to transmissions by system B 130, as described in more detail below.

With regard to embodiments which are directed to TD-ULACS, TD-ULACS may use a period that is traffic driven, as opposed to using a fixed period that is used by Carrier Sense Adaptive Transmission (CSAT). Within the period, system B 130 may be transmitting ("ON") or muted ("OFF"). TD-ULACS may start the transmissions of system B 130 as the packets (for transmission) become available to be transmitted, as long as the System B transmission rate is not exceeded and System A QoS requirements are met. TD-ULACS may stop system B 130 from transmitting once the system B data queue is empty or the System A QoS requirements are not met. This estimated System B transmission rate may be based on Radio Frequency channel conditions.

System B 130 may ensure that a load that is to be transmitted by system B 130 (over an unlicensed channel) fits system B's transmission rate estimation budget in a given time period As described above, with certain embodiments, ULACS adapts the transmission opportunities of system B 130 based on a long term load of system A 120 on the unlicensed carrier. ULACS may adapt the transmission opportunities of system B by modifying the transmission period of system B 130. The adaption period may have a duration of a few seconds. System A may be using Wi-Fi on the unlicensed carrier.

The load for each of system A 120 and system B 130 may be measured. System A's load may be determined via channel sensing by system B 130. System A's load may also be measured by system A 120 itself, and the measured load may then be reported by system A to system B 130. As another option, system A's load may also be measured by having a device under system B 130 report an interference or report a load of system A. The device may then signal the reported interference/load to system B 130 through system A 120.

A ULACS period may be defined as a time over which system B 130 will be transmitting, and a time over which system B 130 will be muted, according to a duty cycle. A duty cycle can generally be understood as a ratio of transmitting time over a total time period (where a 500 ms transmitting time over a total period of 2 seconds would correspond to a 25% cycle, for example.) The ULACS period may be determined based on the load measurements from one or both of system A and system B, as well as the QoS requirements of system A and/or system B (e.g., requirements relating to a delay, a minimum bitrate, a guaranteed bitrate, etc.).

The ULACS period may be adapted depending on: (1) a load of system A, (2) a QoS parameter of system B (for example, a delay), (3) a QoS parameter estimate of system A (e.g., delay), and/or (4) a load of system B.

Figure 2:
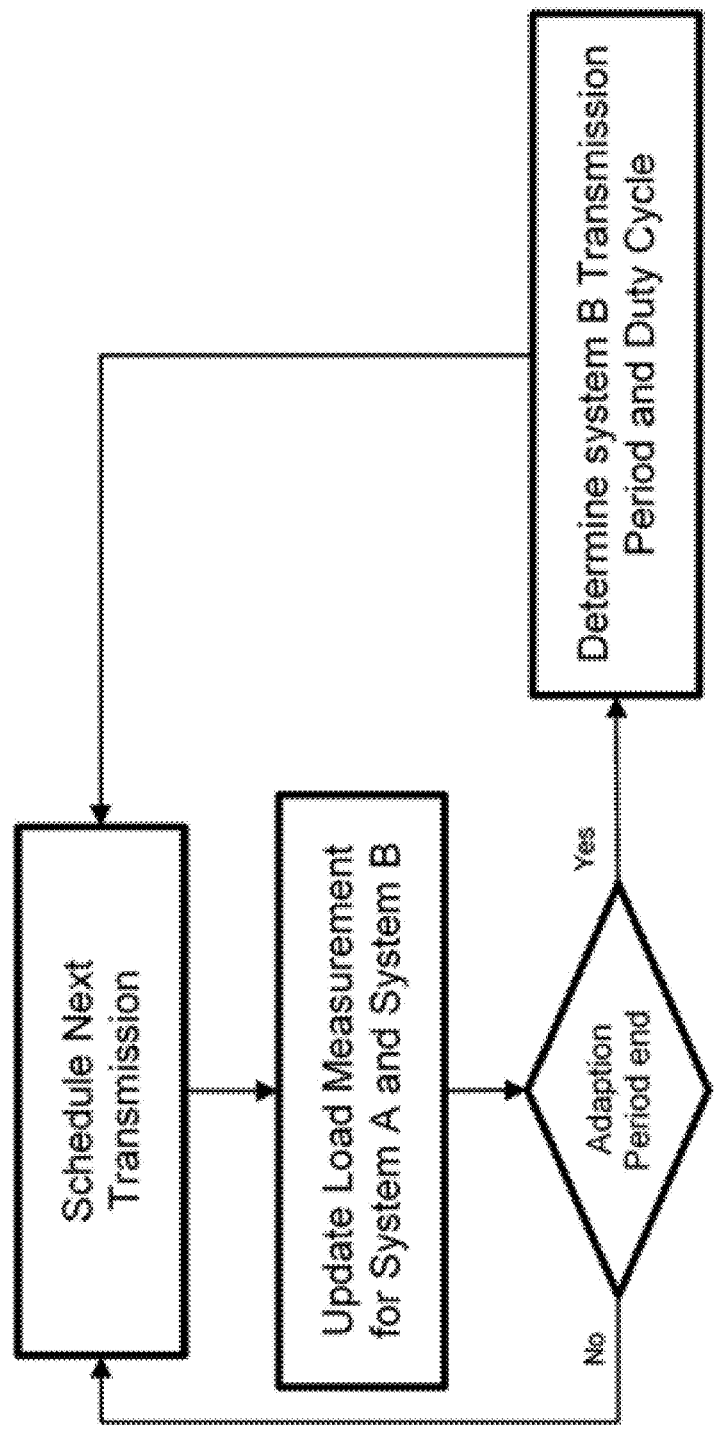
FIG. 2 illustrates a flowchart of an example method for performing adaptation and scheduling, in accordance with certain embodiments of the present invention.

FIG. 2 illustrates a flowchart of an example method for performing adaptation and scheduling, in accordance with certain embodiments of the present invention. As described above, ULACS may utilize the load measurement for system A 120 and/or system B 130 (see "Update Load Measurement for System A and System B" of FIG. 2). After the adaptation period ends, the transmission period and/or the duty cycle may be changed (see "Determine system B Transmission period and Duty Cycle").

With embodiments that use TD-ULACS, TD-ULACS may perform similarly as ULACS (as described above). However, TD-ULACS may adapt the transmission opportunities of system B based on a buffer occupancy of system B. As such, as described above, TD-ULACS may be traffic driven, rather than use a fixed period as used by CSAT. Within the fixed period, system B may be transmitting ("ON") or muted ("OFF"). TD-ULACS may start the system B transmissions as the packets for transmission become available. TD-ULACS may stop the transmitting by system B when the transmissions are completed, as long as system B does not exceed the estimated system B transmission rate.

Figure 3:
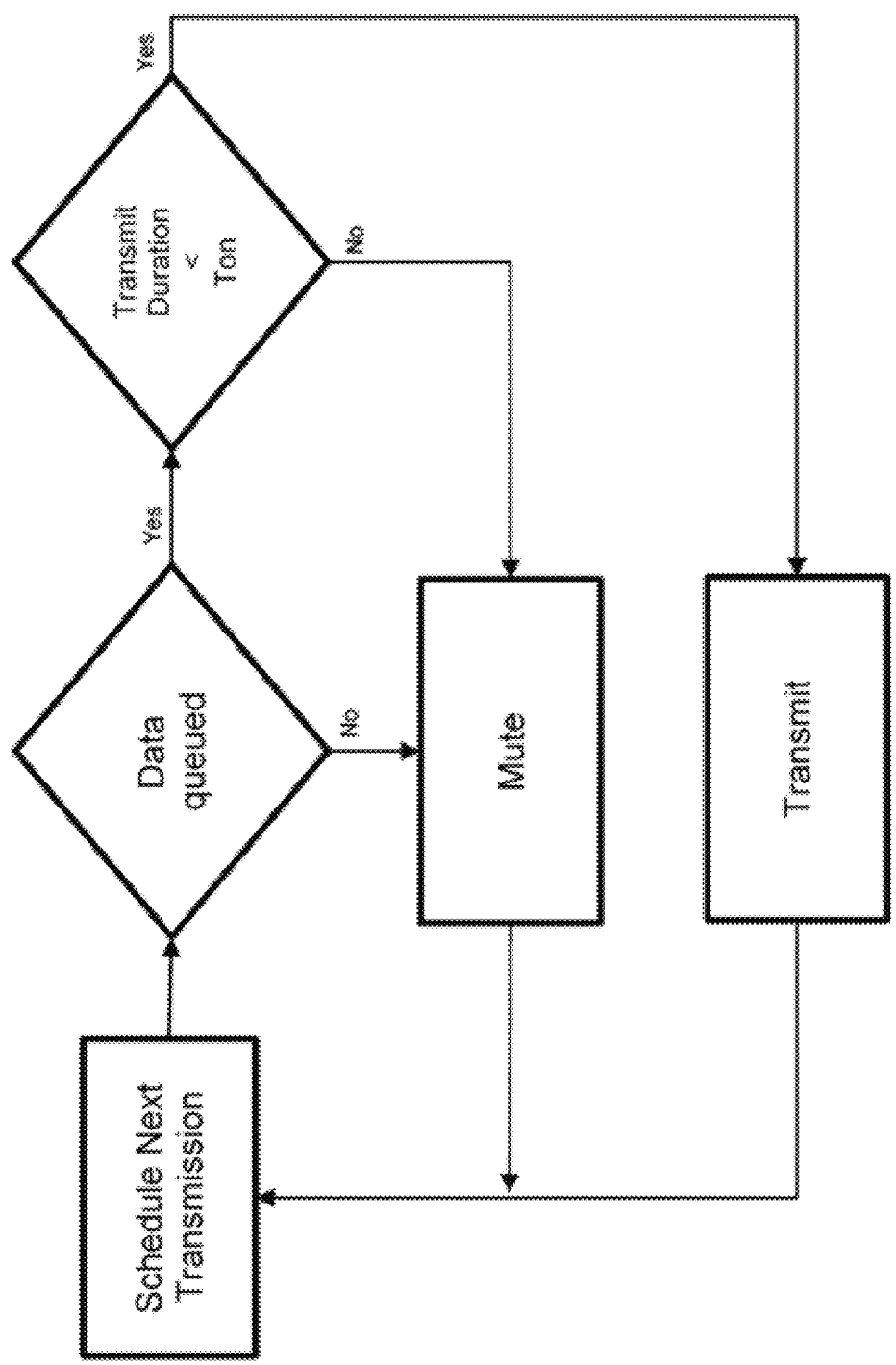
FIG. 3 illustrates a flowchart of an example method for performing Unbiased-Load-Adaptive-Coexistence-Scheme, in accordance with certain embodiments of the invention.

FIG. 3 illustrates a flowchart of an example method for performing Unbiased-Load-Adaptive-Coexistence-Scheme in accordance with certain embodiments of the invention. As described above, TD-ULACS may adapt the transmission of system B based on a buffer occupancy of system B. For example, certain embodiments may determine whether or not data is queued within the buffer of system B (see "Data queued?" of FIG. 3, for example). Next, system B may begin transmitting as long as the transmissions do not exceed a parameter. For example, referring to FIG. 3, system B may transmit as long as the transmission duration is less than a transmission opportunity duration, Ton.

TD-ULACS may be considered as being traffic driven because the transmission in system B may be triggered when packets for transmission become available (i.e., triggered by traffic arrival) rather than being triggered according to a prefixed period, such as in CSAT.

As described above, TD-ULACS may be triggered by a buffer occupancy of system B. The transmissions in system B by TD-ULACS may be adapted if the buffer of system B is empty. For example, the determination of when the transmissions are permitted to occur may be adapted. The transmissions may also be adapted depending on whether QoS requirements of system A are met. The transmissions in system B may be staggered such that a delay limit is not exceeded for system A. The transmissions in system B may also be adapted based on whether load limitations (which are previously based on loads of system A and system B) are met.

Figure 4:
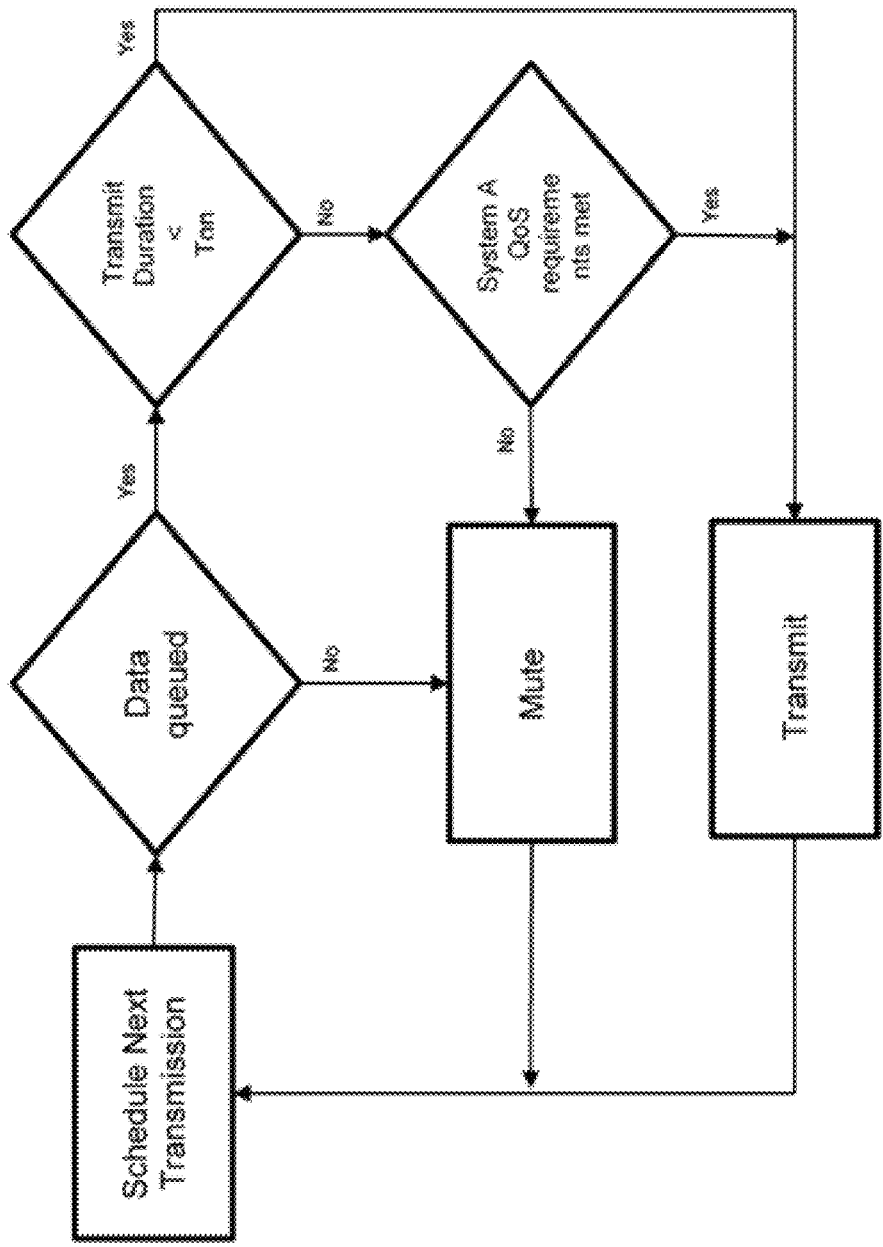
FIG. 4 illustrates a flowchart of an example method for performing Traffic Driven Unbiased-Load-Adaptive-Coexistence-Scheme in accordance with certain embodiments of the invention.

FIG. 4 illustrates a flowchart of an example method for performing Traffic Driven Unbiased-Load-Adaptive-Coexistence-Scheme in accordance with certain embodiments of the invention. In the example of FIG. 4, the transmissions in system B are adapted based on the QoS requirements of system A (see "System A requirements are met?").

With regard to CSAT, as described above, CSAT generally triggers transmissions according to a prefixed period. CSAT generally provides a fixed period and an adaptive transmission duty cycle for system B, based on system A's channel utilization. However, CSAT does not take into account any constraints from system B, such as the channel utilization or QoS requirements of system B.

The fixed period of CSAT may be a pre-configured time interval that the system will refer to for performing transmissions, if there is data that needs to be transmitted. The fixed period of CSAT is generally between 200 ms to 500 ms. Little to no adaptations are expected to be applied to the CSAT period.

The CSAT duty cycle may define a time over which system B will either be transmitting or be muted within a CSAT period. This duty cycle is generally determined based on the load measurements from only system A. At the beginning of the CSAT period, the load measurements of system A may be used to set the duty cycle.

In view of the above-described ULACS and CSAT mechanisms, certain embodiments may utilize combination of ULACS functions and CSAT functions. Specifically, certain embodiments may adapt the transmission opportunities of system B by using a Hybrid ULACS. Hybrid ULACS may follow a fixed period as described for CSAT, but, if system B is already transmitting, system B will be allowed to continue transmitting until the buffer of system B is empty. As described above, the CSAT period may be a pre-configured time interval that system B will refer to in order to determine whether transmissions are to be started, if there is data that needs to be transmitted. As described above, the CSAT period is generally between 200 ms to 500 ms. Little to no adaptations are expected for the CSAT period.

As described above, The CSAT Duty Cycle may define the time over which the system B is allow to transmit within a CSAT period. For example, system B may transmit in the ON period, during the CSAT period. The remainder of the time in the CSAT period is the OFF period The duty cycle may be determined based on the load measurements from only System A. At the beginning of a CSAT period, the load measurements of System A may be used to set the duty cycle. However, if System B has data queued and is transmitting, System B may continue transmitting without regard to the adapted duty cycle.

Figure 5:
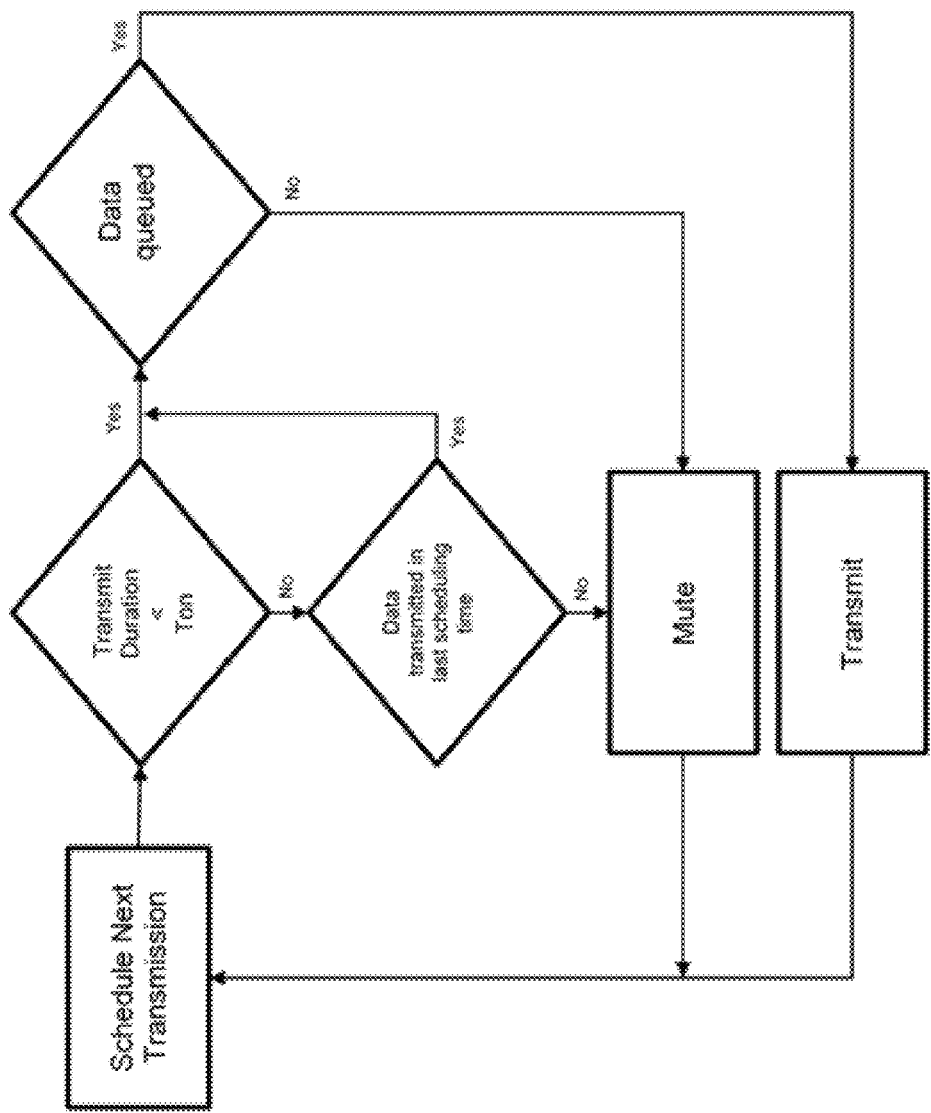
FIG. 5 illustrates a flowchart of an example method for performing hybrid Unbiased-Load-Adaptive-Coexistence-Scheme in accordance with certain embodiments of the invention.

FIG. 5 illustrates a flowchart of an example method for performing hybrid Unbiased-Load-Adaptive-Coexistence- Scheme in accordance with certain embodiments of the invention. As described above, certain embodiments may allow System B to continue transmitting if System B has data queued and is already transmitting (see "Data transmitted in last scheduling time" of FIG. 5, for example).

Figure 6:
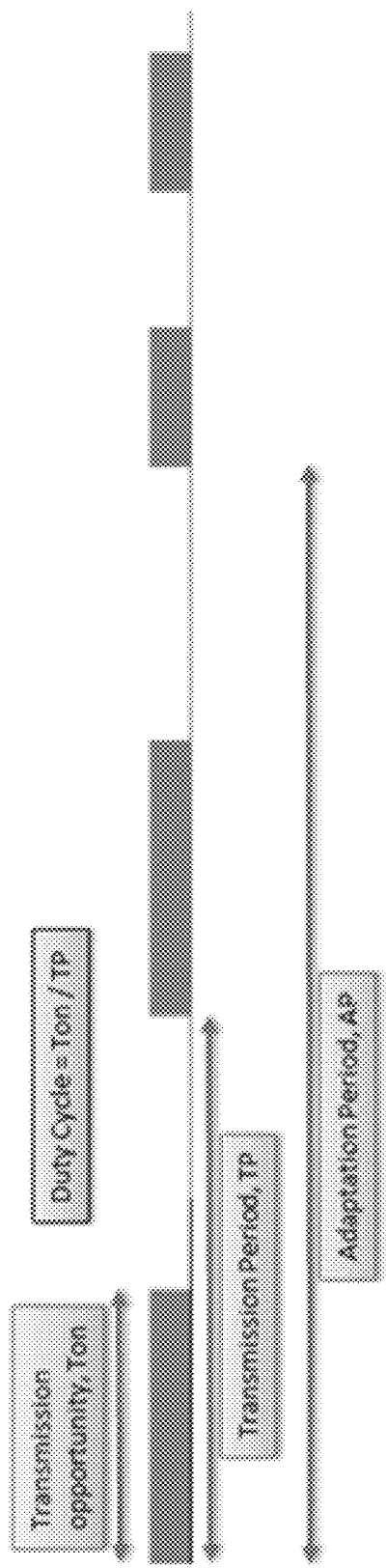
FIG. 6 illustrates example timing parameters in accordance with certain embodiments of the invention.

FIG. 6 illustrates example timing parameters in accordance with certain embodiments of the invention. FIG. 6 illustrates an example transmission period TP, where the transmission period includes a transmission opportunity duration Ton, where system B 130 may be transmitting ("ON"). The example transmission period TP also may include a duration where system B is muted ("OFF"). As described above, after an adaptation period AP elapses, the period and/or duty cycle of system B 130 may be changed.

FIG. 7 compares segmented/unsegmented scheduling opportunities, adaptation factors, and dynamic parameters, among different methods, in accordance with certain embodiments of the invention. FIG. 7 illustrates differences between each of ULACS, TD-ULACS, CSAT, and Hybrid-ULACS, as described above.

Figure 8:
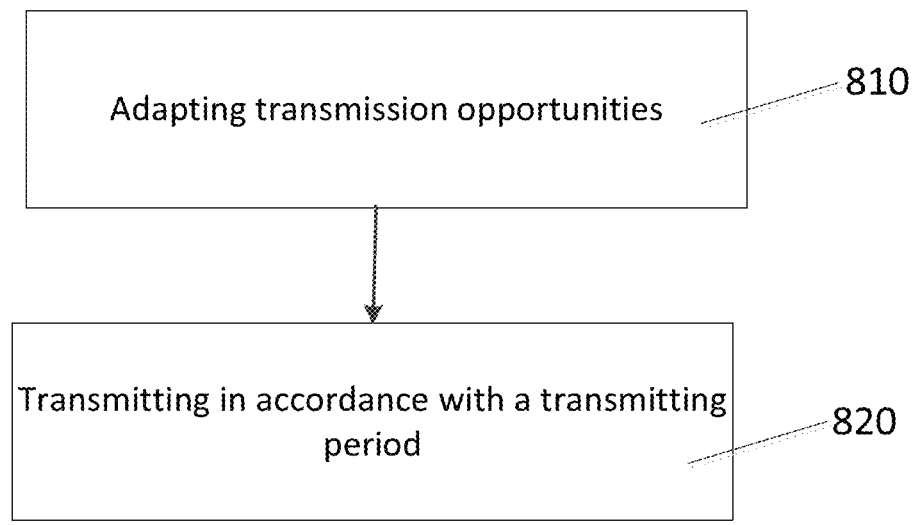
FIG. 8 illustrates a flowchart of an example method, in accordance with certain embodiments of the invention.

FIG. 8 illustrates a flowchart of an example method in accordance with certain embodiments of the invention. The method illustrated in FIG. 8 includes, at 810, adapting, by a first network node, transmission opportunities of the first network node. A radio-technology of the first network node coexists with at least one other radio-access technology of a second network node. The adapting may include adapting when the first network node is able to perform transmissions. The method may also include, at 820, transmitting in accordance with a transmitting period (and/or duty cycle). The transmitting period corresponds to a time over which the first network node is configured to perform transmitting and to be muted. The transmitting may include transmitting on an unlicensed carrier.

Figure 9:
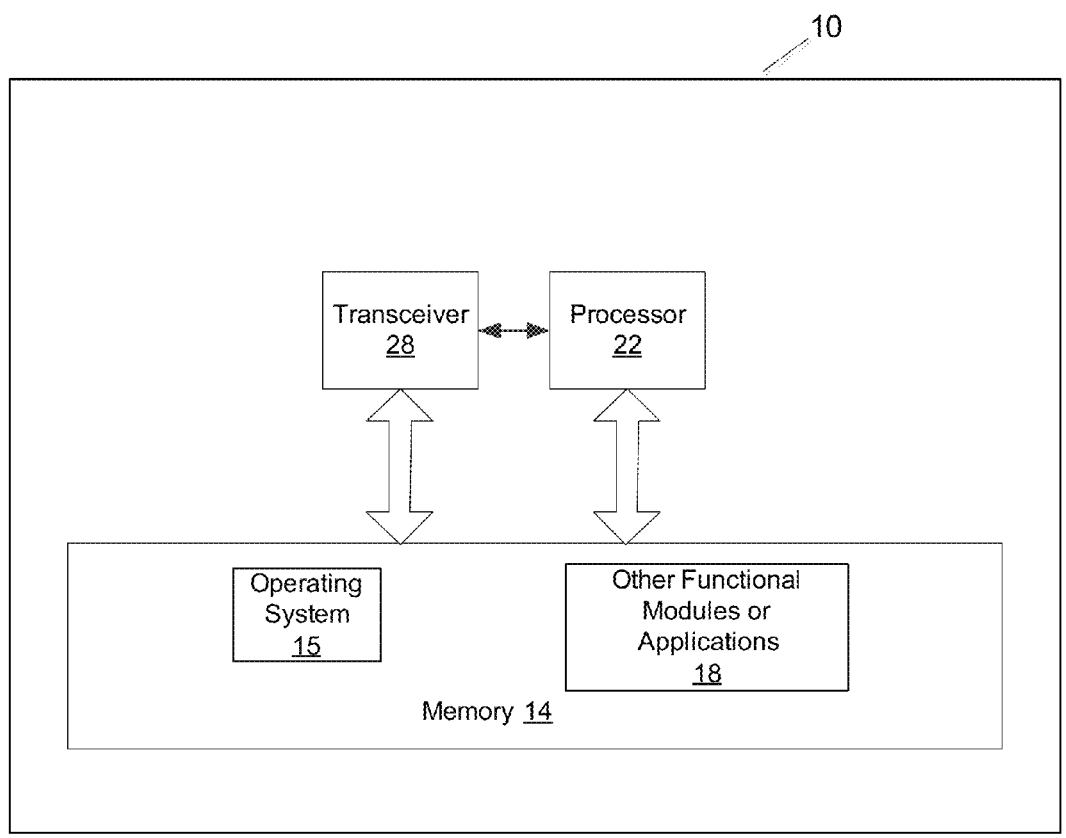
FIG. 9 illustrates an apparatus in accordance with certain embodiments of the invention.

FIG. 9 illustrates an apparatus in accordance with certain embodiments of the invention. In one embodiment, the apparatus can be a evolved Node B, base station, access point, and/or any other type of network node, for example. For example, the apparatus of FIG. 9 may correspond to system B 130 and/or system A 120, as described above. In another embodiment, the apparatus may correspond to a user equipment, for example. Apparatus 10 can include a processor 22 for processing information and executing instructions or operations. Processor 22 can be any type of general or specific purpose processor. While a single processor 22 is shown in FIG. 9, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Apparatus 10 can be configured to adapt transmission opportunities of apparatus 10. A radio-technology of apparatus 10 may coexist with at least one other radio-access technology of a network node. The adapting may include adapting when apparatus 10 is able to perform transmissions. Apparatus 10 may also be configured to transmit in accordance with a transmitting period. The transmitting period corresponds to a time over which apparatus 10 is configured to perform transmitting and to be muted, and the transmitting may include transmitting on an unlicensed carrier.

Figure 10:
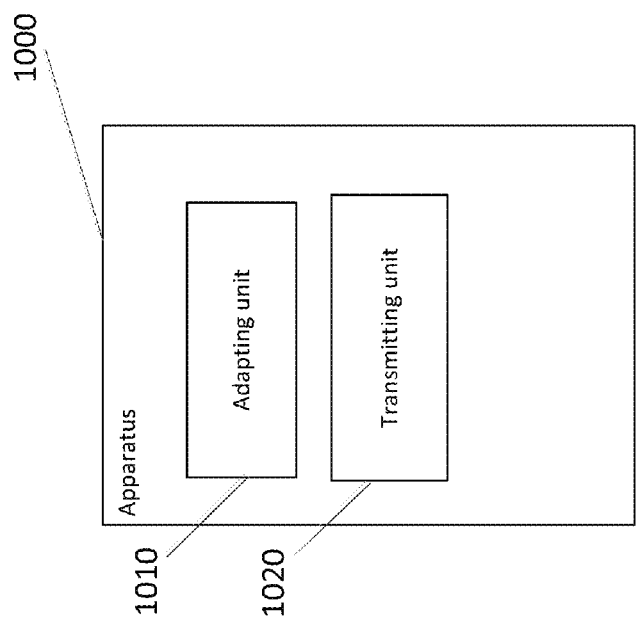
FIG. 10 illustrates an apparatus in accordance with certain embodiments of the invention.

FIG. 10 illustrates an apparatus in accordance with certain embodiments of the invention. Apparatus 1000 can be a base station, access point, evolved Node B, and/or any other type of network node, for example. Apparatus 1000 can correspond to system B 130, as described above. Apparatus 1000 can include an adapting unit 1010 that adapts transmission opportunities of the apparatus 1000. A radio-technology of the apparatus 1000 coexists with at least one other radio-access technology of a network node. The adapting may include adapting when the first network node is able to perform transmissions. Apparatus 1000 may also include a transmitting unit 1020 that transmits in accordance with a transmitting period. The transmitting period corresponds to a time over which the first network node is configured to perform transmitting and to be muted, and the transmitting may include transmitting on an unlicensed carrier.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
adapting, by a first network node, transmission opportunities of the first network node, wherein a radio-access technology of the first network node coexists with at least one other radio-access technology of a second network node, and the adapting comprises adapting when the first network node is able to perform transmissions; and
transmitting one or more signals in accordance with a transmitting period, wherein the transmitting period corresponds to a time over which the first network node is configured to perform transmitting and to be muted, and the transmitting comprises transmitting on an unlicensed carrier, wherein
the adapting comprises changing the transmitting period based on a measured load of the second network node and a quality-of-service parameter, and
the adapting comprises triggering the transmitting based on traffic arrival, and the traffic arrival corresponds to when packets for transmission by the first network node become available.

2. The method according to claim 1, wherein the transmitting comprises transmitting until a transmission is complete, as long as the transmitting does not exceed an estimated transmission rate.

3. The method according to claim 1, further comprising:
determining whether the first network node is currently performing transmissions, wherein
if the first network node is currently performing transmissions, the first network node continues transmitting until a buffer of the first network node is empty, and
the transmitting period comprises a pre-configured, fixed period.

4. The method according to claim 3, wherein the transmitting period corresponds to a length of time between 200 ms and 500 ms.

5. An apparatus, comprising:
at least one processor; and
at least one memory including computer program code,
the at least one memory and the computer program code configured, with the at least one processor, to cause the apparatus at least to:
adapt transmission opportunities of the apparatus, wherein a radio-access technology of the apparatus coexists with at least one other radio-access technology of a network node, and the adapting comprises adapting when the apparatus is able to perform transmissions; and
transmit one or more signals in accordance with a transmitting period, wherein the transmitting period corresponds to a time over which the apparatus is configured to perform transmitting and to be muted, and the transmitting comprises transmitting on an unlicensed carrier, wherein
the adapting comprises changing the transmitting period based on a measured load of the second network node and a quality-of-service parameter, and
the adapting comprises triggering the transmitting based on traffic arrival, and the traffic arrival corresponds to when packets for transmission by the first network node become available.

6. The apparatus according to claim 5, wherein the transmitting comprises transmitting until a transmission is complete, as long as the transmitting does not exceed an estimated transmission rate.

7. The apparatus according to claim 5, wherein the apparatus is further caused to:
determine whether the apparatus is currently performing transmissions, wherein
if the apparatus is currently performing transmissions, the apparatus continues transmitting until a buffer of the apparatus is empty, and
the transmitting period comprises a pre-configured, fixed period.

8. The apparatus according to claim 7, wherein the transmitting period corresponds to a length of time between 200 ms and 500 ms.

9. A computer program product, embodied on a non-transitory computer readable medium, the computer program product configured to control a processor to perform a method, comprising:
adapting, by a first network node, transmission opportunities of the first network node, wherein a radio-access technology of the first network node coexists with at least one other radio-access technology of a second network node, and the adapting comprises adapting when the first network node is able to perform transmissions; and
transmitting one or more signals in accordance with a transmitting period, wherein the transmitting period corresponds to a time over which the first network node is configured to perform transmitting and to be muted, and the transmitting comprises transmitting on an unlicensed carrier, wherein
the adapting comprises changing the transmitting period based on a measured load of the second network node and a quality-of-service parameter, and
the adapting comprises triggering the transmitting based on traffic arrival, and the traffic arrival corresponds to when packets for transmission by the first network node become available.

10. The computer program product according to claim 9, wherein the transmitting comprises transmitting until a transmission is complete, as long as the transmitting does not exceed an estimated transmission rate.

11. The computer program product according to claim 9, wherein the method further comprises:
determining whether the first network node is currently performing transmissions, wherein
if the first network node is currently performing transmissions, the first network node continues transmitting until a buffer of the first network node is empty, and
the transmitting period comprises a pre-configured, fixed period.

12. The computer program product according to claim 11, wherein the transmitting period corresponds to a length of time between 200 ms and 500 ms.

* * * * *